May 12, 1964  E. KADISEVSKIS  3,133,169
CALIBRATING MEANS FOR A SNAP-ACTING SWITCHING MECHANISM
Filed Oct. 20, 1960  4 Sheets-Sheet 1

Inventor,
Edmunds Kadisevskis,
by Harold Levine
Att'y.

May 12, 1964 E. KADISEVSKIS 3,133,169
CALIBRATING MEANS FOR A SNAP-ACTING SWITCHING MECHANISM
Filed Oct. 20, 1960 4 Sheets-Sheet 2
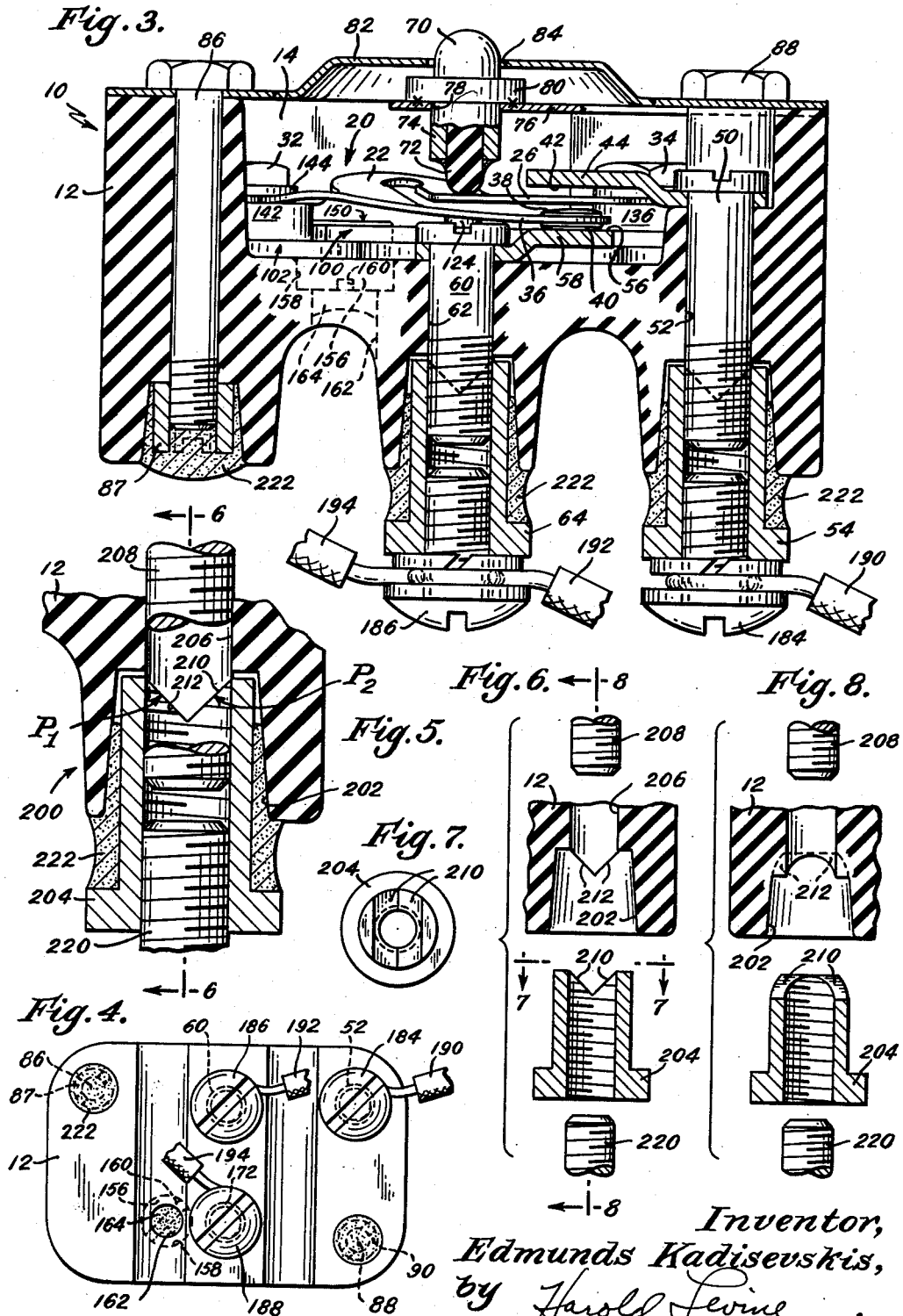
Inventor,
Edmunds Kadisevskis,
by Harold Levine
Att'y.

May 12, 1964 E. KADISEVSKIS 3,133,169
CALIBRATING MEANS FOR A SNAP-ACTING SWITCHING MECHANISM
Filed Oct. 20, 1960 4 Sheets-Sheet 3
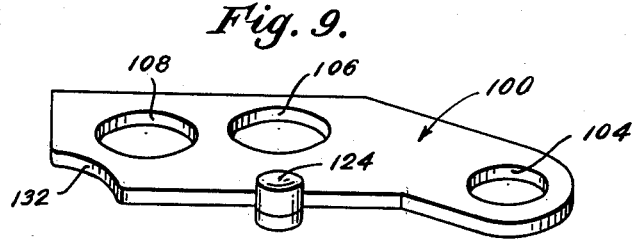
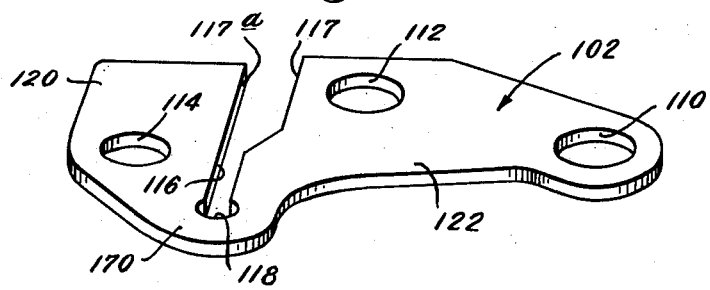
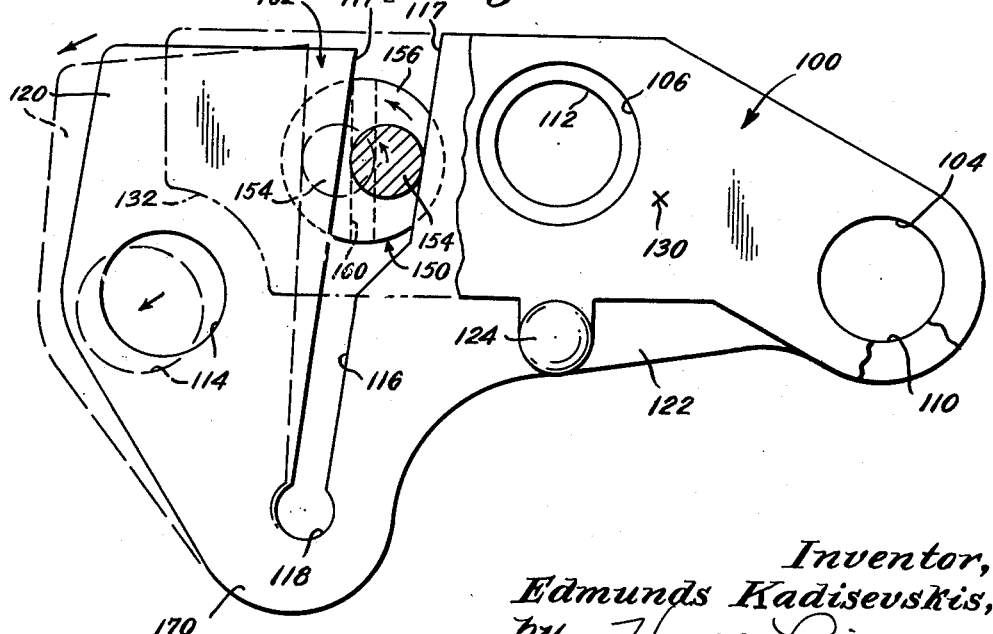
Inventor,
Edmunds Kadisevskis,
by Harold Levine
Att'y.

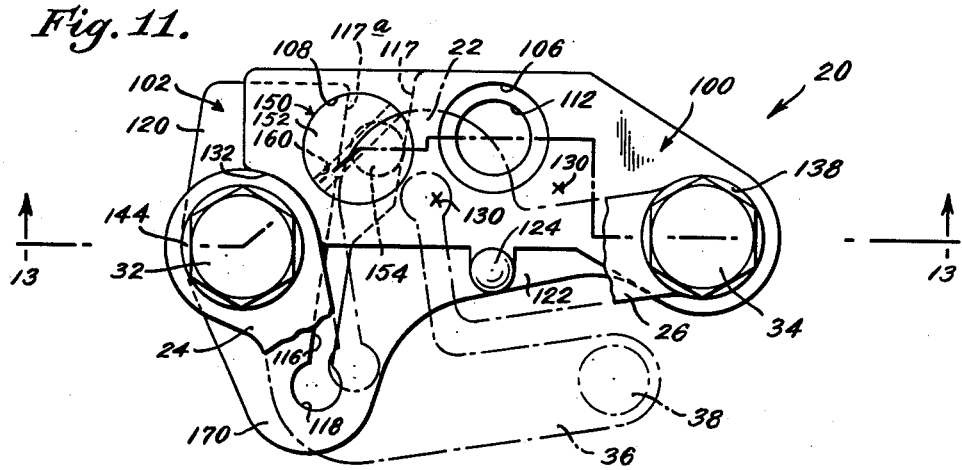
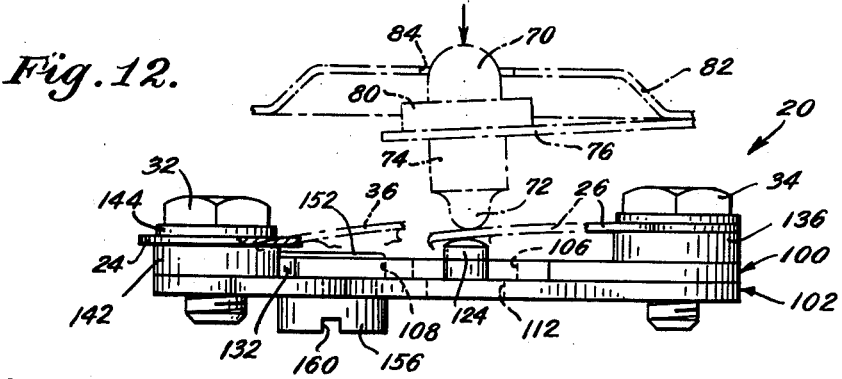
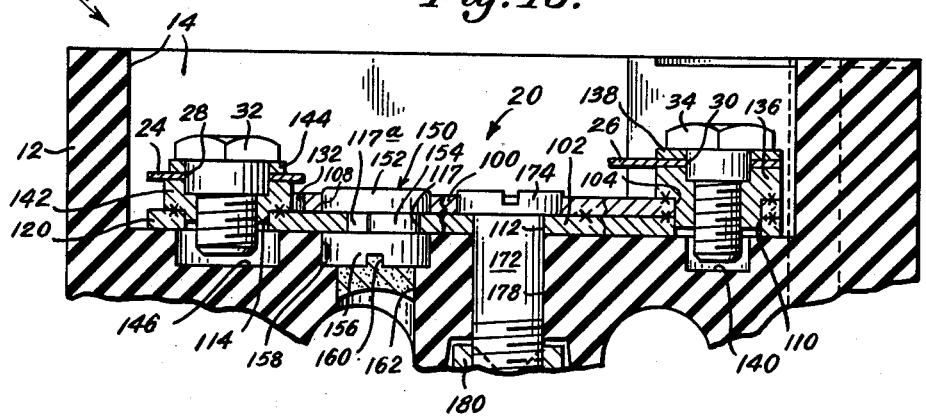

United States Patent Office 3,133,169
Patented May 12, 1964

3,133,169
CALIBRATING MEANS FOR A SNAP-ACTING SWITCHING MECHANISM
Edmunds Kadisevskis, Attleboro, Mass., assignor to Texas Instruments Incorporated, Dallas, Tex., a corporation of Delaware
Filed Oct. 20, 1960, Ser. No. 63,913
12 Claims. (Cl. 200—67)

This invention relates to electrical switches, and generally involves precision switches which employ a snap-acting member to effect switching. The invention is particularly concerned with providing new and improved means for calibration and means for mounting threaded terminals and other threaded members on a base or housing which may be used for such switches.

It is one object of the instant invention to provide a means for calibrating a snap-acting switching element which is simple in construction and economical to assemble and manufacture.

It is another object of the instant invention to provide a means for calibrating a switching mechanism by which calibration may easily and accurately be effected, and which reliably maintains the parts in desired calibration at elevated temperatures or under shock and vibration to which the switch may be subjected during operation.

It is another object of the invention to provide calibrating means with which calibration may be easily and accurately effected externally of the switching device.

It is another object of the instant invention to provide a novel and improved means for mounting an internally threaded member on a base, whereby relative movement between the base and the internally threaded member is inhibited to facilitate reception of a mating threaded bolt member for threaded engagement therein.

It is yet another object of the instant invention to provide a novel and improved means for mounting a threaded receiving member on a base member formed of a frangible or relatively brittle material whereby relative movement between the member and the base is prevented without incurring cracking or fracture of the base member.

It is yet a further object of the invention to provide a new and improved means for tightly and fixedly mounting a terminal on a base or housing member.

It is yet a further object of the invention to provide a new and improved means of firmly and tightly mounting members on a base member or housing member formed of frangible or brittle material.

Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of the various possible embodiments of the invention is illustrated:

FIG. 3 is a sectional view taken on line 3—3 of FIG. 1;

FIG. 4 is a bottom view on a reduced scale of the switch shown in FIG. 1;

FIG. 5 is an enlarged fragmentary detail view of a part of the switch shown in FIG. 3, with parts broken away for clarity of illustration;

FIG. 6 is an exploded view taken on line 6—6 of FIG. 5;

FIG. 7 is a plan view taken on line 7—7 of FIG. 6;

FIG. 8 is an exploded view taken on line 8—8 of FIG. 6;

FIGS. 9 and 10 are perspective views of parts of the calibrating means according to the instant invention;

FIG. 11 is a top plan view of a subassembly showing the parts in assembled relation prior to calibration, the position of which parts correspond to the solid-line position of the parts in FIG. 14;

FIG. 12 is a front elevational view of the assembly shown in FIG. 11;

FIG. 13 is a developed sectional view taken on line 13—13 of FIG. 1 and line 13—13 of FIG. 11; and FIG. 14 is a plan view showing relative movement between parts of a subassembly which includes the calibrating mechanism according to the instant invention.

Corresponding reference characters indicate corresponding parts throughout the several views of the drawings.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
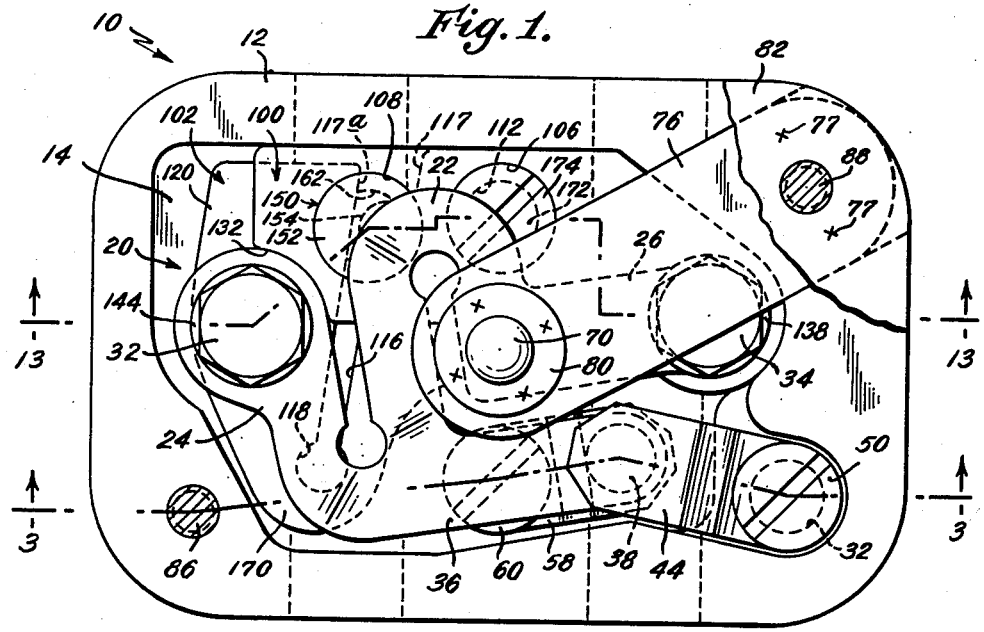
FIG. 1 is a plan view, with part of the cover removed, of an exemplary switch which embodies features according to the instant invention.
Figure 2:
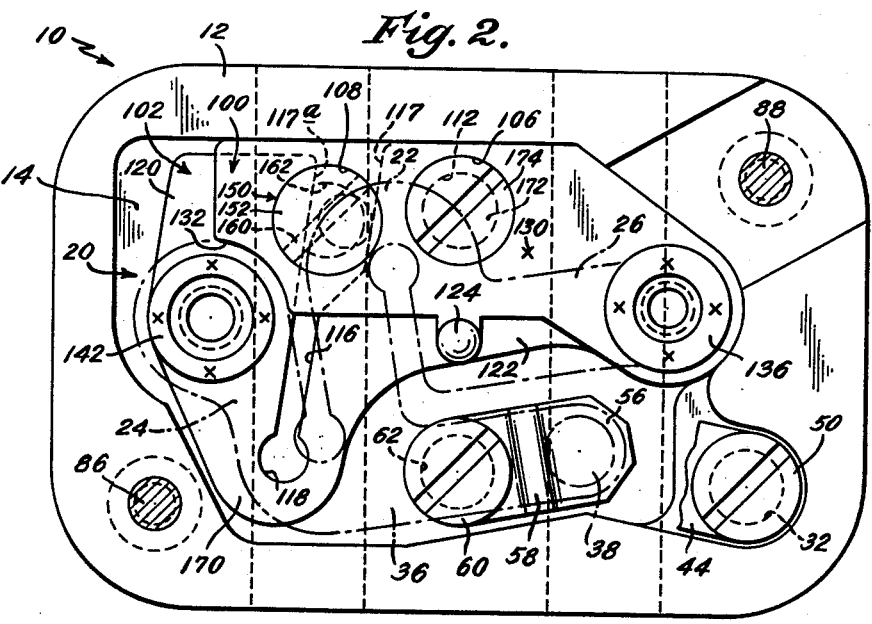
FIG. 2 is a plan view similar to FIG. 1, with additional parts omitted and certain of the parts shown in broken lines for clarity of illustration.

Referring now to the drawings, FIG. 1 illustrates an electrical switch according to this invention, generally designated by numeral 10. Switch 10 is a high precision electrical switch which is operable at elevated temperatures, and employs a snap-acting switching element for which calibration can accurately be controlled and reliably maintained by the calibrating means of the instant invention. Switches produced according to the instant invention will retain precise operating characteristics and calibration of the snap-acting switching element at elevated operating temperature conditions, and under shock and vibration.

Switch 10 includes a casing member 12 formed of an electrically insulating material such as, for example, a ceramic or one of the phenolic thermosetting resinous materials. Casing 12 provides a cavity 14 in which is disposed a switching mechanism subassembly generally referred to by numeral 20.

Switching mechanism 20 includes a snap-acting element 22 which may take the form of a sine blade of the type shown and described in the Burch Patent No. 2,630,504, issued on March 3, 1953. The "sine blade" switching element 22 is so called because its shape resembles a sine wave. The sine blade switching element 22 is a flat, single-piece, electrically conductive spring element supported at both ends and placed under a predetermined accurately controlled amount of tension. Blade element 22 includes integrally formed spaced leg mounting portions 24 and 26, each of which are provided with suitable apertures 28 and 30 for respectively receiving mounting studs 32 and 34. Sine blade 22 includes an integrally formed contact leg or arm 36 which mounts and carries a pair of oppositely facing electrical contacts 38 and 40 at its free end. When actuated, the sine blade provides a torsional snap action. Actuator movement, e.g. in the form of a positively applied force, in one direction, causes movement of the contact arm 36 in the opposite direction.

Movable contact 38 is positioned for engagement with stationary contact 42, provided by terminal member 44. Terminal member 44 is mounted on casing 12 by means of a threaded bolt 50 which is received in an aperture 52 provided by casing 12. Bolt 50 is maintained in fixed, assembled relation by means of nut 54, as best seen in FIG. 3. The relationship and nature of construction of nut 54, bolt 50 and the co-operating portions of casing 12 will be described in greater detail below.

Movable contact 40 is positioned for engagement with stationary contact 56 provided by terminal 58. Terminal 58 is mounted on casing 12 by bolt 60 in a manner similar to that described above for terminal 44. Bolt 60 is received in an aperture 62 provided by casing 12, and is maintained in fixed assembled relation by nut 64.

Mounting bolts 32 and 34 are so spaced as to tension and stress the element 22 into a deformed configuration whereby leg 36 is urged out of the plane formed by legs 24 and 26 in the unstressed condition.

Contact leg 36 can assume either of two positions on opposite sides of the plane formed by legs 24 and 26. It is to be understood that either one or both of these positions of opposite configuration may be relatively stable, depending on the restraints to movement of leg 36 which may be provided. Sine blade 22 is adapted to snap leg 36 to respectively open contacts 40 and 56, and close contacts 38 and 42, upon the application of a positive force to leg 26, as best seen in FIGS. 1, 3 and 12. Positive actuating forces are transmitted to blade 22 by an actuating button 70. Actuating button 70 includes a projection 72, formed of a ceramic or electrically insulating material, and is adapted to engage the sine blade at one end of leg 26, as best seen in FIGS. 1 and 3. Projection 72 is carried by a sleeve member 74 which, in turn, is mounted on a spring member 76. Sleeve 74 is received within a suitable aperture 78 provided by spring member 76, and includes a flange 80 which is welded to spring member 76, as best seen in FIG. 3. Spring member 76 biases the entire actuating button assembly upwardly (as seen in FIG. 3), in a direction away from sine blade 22. Switch 10 includes a cover member 82, as shown. Cover member 82 is provided with an aperture 84 through which button 70 extends and is loosely received therein for reciprocal vertical motion. Spring member 76 also biases the actuator button assembly toward cover member 82 to dispose button 70 exteriorly of cover member 82. Spring member 76 is welded to cover 82 and is mounted on casing 12 by means of bolt 88 and nut 90, as shown. Bolt 86 and nut 87 also serve to mount cover member 82 on base or casing 12, as shown.

It can thus be seen that, upon the application of a predetermined actuating force to actuating pin 70, in the direction of the arrow shown in FIG. 12, sine blade 22 will snap to an opposite configuration and will snap contact-carrying arm 36 to open contacts 40 and 56, and respectively close contacts 38 and 42. Upon release of the force, contact arm 36 will snap to open contacts 38 and 42, and close contacts 40 and 56.

The movement differential (the minimum amount of actuator 70 movement necessary to operate the switch) of the switch varies with the tension on the blade which is measured in terms of blade elongation. As will be clear, the movement differential starts at a minimum at very low sine blade 22 tension. At this minimum, contact pressures are low and as tension is increased, movement differential increases accordingly to reach a maximum. Calibration of the sine blade 22 is controlled by increasing or decreasing the blade tension, which in turn is controlled by the spacing of the mounting studs or posts 32 and 34. In accordance with the instant invention, the calibration of the sine blade 22 can be accurately controlled and positively locked once the desired setting is obtained.

Referring now to FIGS. 9–14, the calibrating means according to the instant invention includes a support for blade 22 which comprises a pair of mounting plates 100 and 102. Upper mounting plate 100 is provided with three spaced apertures 104, 106 and 108, as best seen in FIG. 9. Lower mounting plate 102, as best seen in FIG. 10, is provided with three apertures 110, 112 and 114. Lower mounting plate 102 further includes an open-ended slot 116, which is wider adjacent its open end as at 117. The apex of slot 116 is substantially circular, as shown at 118. Slot 116 segregates or separates lower plate 102 into two portions 120 and 122. Upper plate 100 includes a projection 124 which, when in final assembled condition, is effective to engage the lower surface of leg 26 of sine blade 22 as a stop to limit downward movement thereof in response to an actuating force applied through button 70 (see FIGS. 11 and 12). Apertures 104 and 110 are substantially the same diameter. Aperture 106 of plate 100 is somewhat larger than corresponding aperture 112 in plate 102, to provide a shoulder to accommodate the head of a mounting bolt to be received therein.

Mounting plates 100 and 102 are assembled so that apertures 104 and 110 and holes 106 and 112 register and are substantially concentric to facilitate reception of threaded members therein, as will be described below. The plates 100 and 102, when assembled as shown in FIGS. 1, 2, 11 and 14, dispose aperture 108 in registry with the widened open-end portion 117 of slot 116. Plates 100 and 102 are welded together, as at point or points 130 (see FIG. 11) to prevent relative movement or rotation between the plates.

Referring now to FIG. 13, a flanged, internally threaded nut 136 is disposed in holes 104 and 110, and is welded to both plates 100 and 102 to retain nut 136 in fixed position and further prevent and inhibit relative rotation between plates 100 and 102. Leg 26 of sine blade 22 is mounted on plates 100 and 102 by means of mounting stud 34, washer 138 (interposed between leg 26 and mounting stud or bolt 34) and nut 136, as best seen in FIG. 13. Casing 12 provides an aperture 140 to loosely receive the projecting end of mounting stud 34. Mounting stud 34 and nut 136 co-operate to tightly and securely mount leg 26 on plates 100 and 102.

Flanged nut 142 is disposed in aperture 114 in the section or segment 120 of lower plate 102, and is welded thereto, as shown in FIG. 13. Leg 24 of sine blade 22 is securely and tightly mounted on segment 120 of the lower plate 102, by means of nut 142, mounting stud 32 and washer 144, as best seen in FIGS. 12 and 13.

Nut 142 is not welded to the upper plate 100, and will move (along with leg 24 of sine blade 22) relative to the upper plate 100 when section 120 is moved relative to section 122 of lower plate 102 for calibration. Curved recessed corner portion 132 of upper plate 100 provides clearance for nut 142 and mounting stud 32 to move relative to the upper plate for calibration. As best seen in FIG. 13, base 12 provides a cavity 146 which is adapted to loosely receive the projecting portion of mounting stud 32 and provide sufficient clearance for stud 32 to move relative to the base.

The switching mechanism subassembly 20, as thus far described, firmly mounts leg 26 of the sine blade to both the upper and lower plates, and mounts leg 24 on the lower plate only at portion 120 thereof.

Referring now to FIGS. 13 and 14, there is disposed within aperture 106 and the widened portion 117 of calibrating slot 116, a rotatable eccentric calibrating member generally referred to by numeral 150. Member 150 includes a circular head flanged portion 152 which is received within aperture 106 in upper plate 100 to limit movement of member 150 to rotary movement only. Member 150 also includes an eccentric portion 154, which is disposed within widened portion 117 of calibrating slot 116. The other end of member 150 includes a circular flanged portion 156 which is received in a suitable recess 158 provided by casing member 12, which also limits movement of flange portion 156 to rotary movement and precludes or inhibits transverse or lateral movement. Flanged portion 156 includes a slot 160 which is adapted to receive a tool to effect rotation of member 150. Rotation of member 150 (either in a clockwise or counterclockwise direction) moves eccentric portion 154 from its full-line position, shown in FIG. 14 to engage the left-hand wall 117a of wide slot portion 117, as shown in the dashed-line position in FIG. 14. As the eccentric member 150 is rotated and eccentric portion 154 engages wall 117a, the slot 116 is spread and portion 120 moves to the left in the direction of the arrow, pivoting about reduced width portion 170 adjacent the circular apex 118 of slot 116 (as best seen in FIG. 14). Arcuate movement of portion 120 to the left, as shown in FIG. 14, about portion 170 of plate 102 as an axis, causes consequent movement of mounting stud 32, nut 142 and leg 24 of sine blade 22, with resultant elongation and stressing or tensioning of the sine blade 22. Tension in blade 22 may be varied by varying the amount of rotation of eccentric member 150.

As best seen in FIGS. 13 and 4, casing member 12 provides an open-ended recess or cylindrical cavity 162, through which a tool may be inserted into slot 160 in flange 156 to effect rotation of member 150 and consequent calibration of the switching mechanism exteriorly of the switch housing or casing 12. After desired calibration of the sine blade element has been effected, aperture 162 may have disposed therein an electrically insulating cement such as, for example, an epoxy material 164 to seal the parts in final, assembled and adjusted relation.

In practice, eccentric member 150 is disposed in slot 117 of plate 102, after which upper plate 100 is welded to plate 102 in the manner above described, with flanged or headed-over portion 152 disposed in aperture 108. Thereafter, nuts 142 and 136 are disposed within their respective apertures in plates 100 and 102, and welded to the plates as above described. The switching mechanism subassembly 20 (without sine blade 22) is then conveniently and uniquely mounted on base 12 by means of a single mounting connection. As best seen in FIG. 13, this single mounting connection is made by means of a bolt 172 having its flanged portion 174 disposed in aperture 106 of plate 100. The shank of bolt 172 extends through aperture 112 in plate 102, and also through a suitable open-ended cylindrical cavity or aperture 178 provided in base 12. Nut 180, which is or may be similar to nuts 54 and 64 above described, is threaded about bolt 172 to tightly and securely mount the switching subassembly on base 12. Thereafter, sine blade 22 is mounted in the manner described above, and calibrated exteriorly of the housing 12 after the remainder of the switch 10 has been assembled.

By mounting the switching subassembly with a single mounting connection to the base, thermal expansion of the switching subassembly which might result during elevated operational temperatures is not impeded and does not create stresses and possible calibration shifts which might otherwise result with multiple mounting connections. The cavity 14 in base 12 provides sufficient clearance for thermal expansion of the switching subassembly 20. This advantageous feature, in co-operation with the other features mentioned above, further tends to assure reliability and precision during the operational life of the switch.

Bolt 172, in addition to mounting the switching subassembly 20 on base 12, as above described, further serves as a common terminal for the sine blade element 22. The electrical switch 10 includes three exteriorly extending electrical terminals, respectively provided by nuts 54, 64 and 180. Nuts 54, 64 and 180 respectively receive screws 184, 186 and 188, as best seen in FIGS. 3 and 4, to respectively mount electrical conductors 190, 192 and 194. Electrical switch 10 provides current paths as follows: through terminal 180 to plates 102, 100; through the sine blade element 22 (which carries current in parallel paths through the blade 22 from the common terminal 180 to the contact arm 36) to stationary contact 56 to terminal 64, or to stationary contact 42 to terminal 54, depending upon the relative position of contact arm 36.

Ambient compensation for the switching subassembly 20, to eliminate undesirable differential thermal expansion, may be accomplished by forming plates 100 and 102 and the sine blade 22 of substantially the same materials or of materials which have substantially the same coefficient of thermal expansion.

The instant invention provides a construction whereby calibration may advantageously be effected after assembly of the device has been completed. The unique means for calibrating, according to the instant invention, obviates or at least minimizes deleterious and undesirable calibration shifts which might result during the high operating temperatures, shock or vibration to which the switch may be subjected in operation. Calibration, according to the instant invention, does not require bending or warping of the stationary contacts or blades. The sine blade can be set to movement differentials as low as .001" and will maintain this calibration substantially throughout its life.

Welding plates 100 and 102 together as at 130 and as at nut 136 and limiting adjusting calibrating movement to stressing the metal at the joint or area 170 (on the lower plate 102 adjacent the circular apex of slot 116) prevents or inhibits undesired relative movement between the plates and insures that the device will remain in calibration. If a rivet connection were employed instead of welds 130, relative movement between the plates might take place in handling during assembly or in service. The switches according to the instant invention are particularly adapted for operation at elevated temperatures. Rivet connections have a tendency to loosen and cause deleterious or undesirable calibration shifts when subjected to elevated temperatures and resultant thermal expansion. These potential dangers and problems are advantageously obviated by the construction described above.

The circular apex 118 of slot 116 advantageously serves to minimize stress concentration at area 170 of the lower plate 102 when portion 120 is moved from the solid-line position to the dashed-line position to effect calibration, as above described.

The instant invention also provides a novel and unique construction to facilitate assembly of the switch parts by means of threaded members. In assembling and mounting parts on the base, as by means of bolts 50, 60 and 172, each of which respectively are threaded into flanged nuts 54, 64 and 180, it is desirable that the nuts be received within an aperture in the base member and restrained against rotation therein. By mounting the nut in the base member so as to prevent relative rotation therebetween, an extra handling operation is eliminated, and threaded insertion of the bolt member therein is facilitated.

In the past, it has been proposed to employ square or rectangular shaped nuts which interfit within and are maintained against rotation within complementary shaped recesses in a base member. Such prior proposals present difficulties and problems when ceramic insulating base materials are employed, such as for the casing 12 of electrical switches according to the instant invention. Where a rectangular shaped nut is disposed within a complementary shaped recess in the base, a relatively tight fit between parts is necessary to prevent relative rotation between the parts to facilitate threading of the bolt members therein. The tight fit required by the prior constructions, in addition to problems of economy created by the required close manufacturing tolerances, also creates other problems. Ceramic materials are frangible and notoriously weak in tension. The switches, according to the instant invention, are generally subjected to elevated temperatures during operation, and upon thermal expansion of the nut member, forces are created against the base member which may cause fracture and cracking where there is a tight fit between parts. When sufficient clearance is provided between the rectangular aperture in the base and the rectangular nut member to avoid cracking and fracture of the base upon differential thermal expansion, such clearance will generally result in a free play or looseness of fit between the parts, which is beyond permissible limits for the requirements of the precision switching device. Such free play and looseness of fit of the terminal and other parts may result in deleterious shifts or changes in calibration of the switching element. This feature of the instant invention uniquely provides for tight, secure mounting of the parts whereby undesirable free play and looseness of fit is eliminated or at least minimized, while at the same time, a clearance for thermal expansion to avoid cracking or fracture of the ceramic base material is provided.

The instant invention recognizes and employs to advantage the compressive strength characteristic of ceramic materials. Referring now to FIGS. 5–8, there is illustrated a subassembly generally referred to by numeral 200, which subassembly may be employed for each of the bolts and nuts 50, 54; 60, 64 and 172, 180 described above. Fragmentary portions of base 12 and bolt members are shown throughout FIGS. 5, 6 and 8. Base 12 provides a tapered aperture 202, in which is received a flanged internally threaded bushing or nut member 204.

As best seen in FIG. 5, tapered recess 202 provides adequate clearance for thermal expansion of nut 204 when disposed therein. Base 12 further provides a cylindrical aperture of lesser diameter than that of cavity or aperture 202, for the reception of the threaded shank of a bolt 208. Relative rotation between the base member 12 and nut 204, when the latter is disposed within oversized tapered cavity 202, is uniquely prevented by means of a V-shaped notched portion 210 provided on member 204, which as best seen in FIGS. 6, 7 and 8, mates with and receives a correspondingly shaped projection 212 provided by casing member 12. Notched portion 210 receives projection 212 in mating and interfitting engagement, and co-operates therewith to prevent relative rotation between the nut 204 and casing 12. When threaded shank portion 208 is inserted into aperture 206 of casing 12, and into threaded engagement with nut 204, projection 212 and notched portion 210 co-operate to prevent nut member 204 from rotating within cavity 202 of casing 12. The forces created on the casing which resist rotation of nut 204 within the cavity 202 are shown by the arrows P1 and P2 in FIG. 5. It will be noted that the forces P1 and P2 are compressive forces which can effectively be resisted by a ceramic material which is comparatively strong in compression although weak in tension.

After the threaded shank portion 208 is received within threaded engagement within nut 204 so as to tightly and securely mount the respective parts to the base, the free end of nut 204 may receive a threaded shank 220 of a terminal screw such as to mount electrical leads such as 190, 192 or 194. Threaded shank portion 220 may correspond to the threaded shank portion of terminal screws 184, 186 and 188. After the threaded parts have been assembled, an electrically insulated sealing cement such as, for example, an epoxy material 222 may be disposed in opening 202 to firmly seal and maintain the parts in assembled relation. Epoxy material 222 should be sufficiently resilient so as to permit thermal expansion of nut member 204 and to preclude creation of undesirable tensile stresses in the adjacent portions of casing 12.

It should also be understood that while a substantially V-shaped notched portion has been illustrated and described, that other projection and notched shapes can be employed within the practice of the instant invention. Such other shapes might, for example, include a U-shape or W-shape.

In view of the above, it will be seen that the several objects of the invention are achieved and other advantageous results attained.

Dimensions of certain of the parts as shown in the drawings have been modified for the purposes of clarity of illustration.

As many changes could be made in the above construction without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

I claim:

1. An electrical switch comprising a housing having a base; an electrical switching mechanism mounted on said base, said switching mechanism including a snap-acting member, said snap-acting member comprising a resilient normally flat blade having integrally formed therewith first and second spaced apart portions, said mechanism further including a support, said support comprising first and second plates, said first plate having first and second plate segments, said first plate segment being secured to a portion of said second plate to inhibit relative rotation between said first and second plates, said first blade portion being connected with said second plate segment and said second blade portion being connected with said second plate, the spacing between said connected blade portions being such as to stress said blade to form a predetermined configuration whereby, upon the application of a force to said blade, the latter will snap from said configuration to an opposite configuration; and calibrating means carried by said second plate and having a portion disposed intermediate said first and second plate segments co-operating with said first plate to cause relative movement between said first and second plate segments to vary the spacing between said first and second spaced blade mounting portions whereby to vary the stress on said blade and calibrate said snap-acting mechanism.

2. The switch as set forth in claim 1 whereby said calibrating means is accessible and operable exteriorly of said base.

3. The switch as set forth in claim 1 and wherein said flat blade and said plates are formed of materials having substantially similar coefficients of thermal expansion.

4. An electrical switch comprising a housing having a base; an electrical switching mechanism mounted on said base, said switching mechanism including a snap-acting member, said snap-acting member comprising a resilient normally flat blade having integrally formed therewith first and second spaced apart mounting portions, said mechanism further including a support, said support comprising two plates secured to each other at one portion thereof to inhibit relative rotation therebetween, said first mounting portion being secured to one of said plates and said second mounting portion secured to the other of said plates, the spacing between said secured mounting portions being such as to stress said blade to form a predetermined configuration whereby, upon the application of a force to said blade, the latter will snap from said configuration to an opposite configuration, one of said plates being provided with an open-ended slot and the other of said plates being provided with an aperture adjacent the open end of said open-ended slot; and a rotatable member disposed in said aperture and open-ended slot; said rotatable member having an eccentric portion disposed in said slot and operable upon rotation thereof, to move at least a portion of said one of said plates to vary the spacing between said first and second mounting portions of said blade and thereby vary the stress created in said blade.

5. The switch as set forth in claim 4 and wherein said plates are welded together in an area intermediate said slot and said second mounting portion.

6. The switch as set forth in claim 4 and wherein the apex of said open-ended slot is substantially circular in configuration.

7. The switch as set forth in claim 4 and wherein said blade comprises a sine blade.

8. An electrical switch comprising a housing having a base; an electrical switching mechanism mounted on said base, said switching mechanism including a snap-acting member, said snap-acting member comprising a resilient normally flat blade having integrally formed therewith first and second spaced apart mounting portions, said mechanism further including a support, said support comprising two plates secured to each other at one portion thereof to inhibit relative rotation therebetween, said first mounting portion being secured to one of said plates and said second mounting portion secured to the other of said plates, the spacing between said secured mounting portions being such as to stress said blade to form a predetermined configuration whereby, upon the application of a force to said blade, the latter will snap from said configuration to an opposite configuration, one of said plates being provided with an open-ended slot and the other of said plates being provided with an aperture adjacent the open end of said open-ended slot; a rotatable member disposed in said aperture and open-ended slot; said rotatable member having an eccentric portion disposed in said slot and operable upon rotation thereof, to move at least a portion of said one of said plates to vary the spacing between said first and second mounting portions of said blade and thereby vary the stress created in said blade, and said rotatable eccentric member being provided with a headed portion disposed in an aperture provided by said base wherein rotation of said eccentric rotatable member and calibration of said blade may be effected exteriorly of said switch.

9. A switching device comprising a snap-acting member having first and second spaced apart portions, said device further including first and second support members, said first support member having first and second segments, said first segment being secured to a portion of said second support member to inhibit relative rotation between said first and second support members, said first snap-acting member portion being mounted on said second segment of said first support member and said second snap-acting member portion mounted on said second support member, the spacing between said mounted snap-acting member portions being such as to stress said snap-acting member to form a predetermined configuration whereby, at predetermined conditions the latter will snap from said configuration to a different configuration; and calibrating means carried by said second support member and having a portion disposed intermediate said first and second segments of said first support member co-operating with said first support member to cause relative movement between said first and second segments of said first support member to vary the spacing between said first and second spaced mounted portions of said snap-acting member whereby to vary the stress therein and calibrate said snap-acting member.

10. An electrical switch comprising a pair of electrical contacts and an electrical switching mechanism including a snap-acting member operatively associated with said contacts for snap actuation thereof and having first and second spaced apart portions; said mechanism further including a support, said support comprising first and second support members, said first support member having first and second segments, said first segment being secured to a portion of said second support member to inhibit relative rotation between said first and second support members, said first snap-acting member portion being mounted on said second segment of said first support member and said second snap acting member portion mounted on said second support member, the spacing between said mounted snap-acting member portions being such as to stress said snap-acting member to form a predetermined configuration whereby, at predetermined conditions, the latter will snap from said configuration to a different configuration to actuate said contacts; and calibrating means carried by said second support member and having a portion disposed intermediate said first and second segments of said first support member co-operating with said first support member to cause relative movement between said first and second segments of said first support member to vary the spacing between said first and second spaced mounted portions of said snap-acting member whereby to vary the stress therein and calibrate said snap-acting mechanism.

11. An electrical switch comprising a pair of electrical contacts and an eletcrical switching mechanism including a snap-acting member operatively associated with said contacts for snap actuation thereof and having first and second spaced apart portions; said mechanism further including a support, said support comprising two support members secured to each other at one portion thereof to inhibit relative rotation therebetween, said first portion being mounted on one of said support members and said second portion mounted on the other of said support members, the spacing between said mounted portions being such as to stress said snap-acting member to form a predetermined configuration whereby, at predetermined conditions, the latter will snap from said configuration to a different configuration to actuate said contacts; one of said first and second support members having a slot, open at one end and located intermediate said secured portion thereof and the portion thereof on which said snap-acting member is mounted; and calibrating means for said snap-acting member including a member mounted for rotation having an eccentric portion disposed in said slot for varying the spacing between said first and second spaced mounted portions of said snap-acting member whereby to vary the stress therein and calibrate said snap-acting member.

12. The switch as set forth in claim 1 and wherein said second plate overlies said first plate.

References Cited in the file of this patent

UNITED STATES PATENTS

| | | |
|---|---|---|
| 2,516,236 | Moorhead | July 25, 1950 |
| 2,825,785 | Taylor | Mar. 4, 1958 |
| 2,831,092 | Moodie | Apr. 15, 1958 |
| 2,869,106 | Hasselbohn | Jan. 13, 1959 |
| 2,877,440 | Dorjee | Mar. 10, 1959 |
| 2,899,512 | Burch | Aug. 11, 1959 |

FOREIGN PATENTS

| | | |
|---|---|---|
| 6??,018 | Great Britain | Apr. 26, 1944 |